United States Patent
Robbins

(10) Patent No.: US 8,155,002 B2
(45) Date of Patent: Apr. 10, 2012

(54) METHOD FOR AUTOMATICALLY INFLATING THE RECEIVE WINDOW SIZE IN TCP CONNECTIONS

(75) Inventor: Max Leo Robbins, Portage, IN (US)

(73) Assignee: ARRIS Group, Inc., Suwanee, GA (US)

( * ) Notice: Subject to any disclaimer, the term of this patent is extended or adjusted under 35 U.S.C. 154(b) by 110 days.

(21) Appl. No.: 11/859,574

(22) Filed: Sep. 21, 2007

(65) Prior Publication Data

US 2008/0075000 A1 Mar. 27, 2008

Related U.S. Application Data

(60) Provisional application No. 60/846,390, filed on Sep. 21, 2006.

(51) Int. Cl.
*G01R 31/08* (2006.01)
(52) U.S. Cl. .................................. 370/231; 370/235
(58) Field of Classification Search ............... 370/230.1
See application file for complete search history.

(56) References Cited

U.S. PATENT DOCUMENTS

| 7,500,010 B2 * | 3/2009 | Harrang et al. ............... 709/233 |
| 2002/0136231 A1 * | 9/2002 | Leatherbury et al. ......... 370/442 |
| 2003/0128711 A1 * | 7/2003 | Olariu et al. ................. 370/401 |
| 2006/0248582 A1 * | 11/2006 | Panjwani et al. .............. 726/13 |

* cited by examiner

*Primary Examiner* — Derrick Ferris
*Assistant Examiner* — Matthew Hopkins
(74) *Attorney, Agent, or Firm* — Troy A. Van Aacken; Robert J. Starr

(57) ABSTRACT

An intermediate network element/device intercepts TCP packets/segments from a client and alters them before forwarding them to a server. This facilitates an increase in effective receive window size value over that which is contained in the segments. One aspect alters a TCP segment by replacing the receive window value with a value determined according to a formula and then forwards the segment on to the server. Another aspect alters a scaling factor in a SYN segment and forwards the altered SYN segment on to the server. The server stores the scaling factor to a memory connected thereto and multiplies the scale factor by receive window size values in subsequently received TCP segments. The server uses the product to determine how many segment-bytes to send to the client. The predetermined scaling factor and predetermined formula may both be stored on a memory at the intermediate element for processing thereby.

13 Claims, 3 Drawing Sheets

METHOD FOR AUTOMATICALLY INFLATING THE RECEIVE WINDOW SIZE IN TCP CONNECTIONS

CROSS REFERENCE TO RELATED APPLICATION

This application claims priority under 35 U.S.C. 119(e) to the benefit of the filing date of Robbins, U.S. provisional patent application No. 60/846,390 entitled "Method for automatically inflating the receive window in TCP connections over channel bonded broadband links", which was filed Sep. 21, 2006, and is incorporated herein by reference.

FIELD OF THE INVENTION

This invention relates, generally, to communication networks and, more particularly, to automatically increasing the size of a receive window over a TCP connection.

BACKGROUND

The bandwidth utilized by a TCP session is primarily regulated by the TCP protocol itself. The protocol employs a number of techniques to self-limit the bandwidth it consumes, one of which is Window Size Advertisements. In the header of every packet sent on a TCP connection, the sending host includes the current size of its Receive Window in bytes. This value reflects the number of bytes available at the host to store incoming session data. The TCP peer at the other end of the connection is responsible for limiting the amount of data it transmits such that the total number of unacknowledged bytes in transit is less than or equal to this advertised Receive Window. This mechanism is intended to guarantee that a transmitting host never overflows the receive buffers of its peer.

The Receive Window field in the TCP header is 16 bits wide allowing for a maximum advertised Receive Window size of 64K. To achieve Receive Window sizes greater than 64K, a host may include a Window Scale Option in the initial "SYN" packet sent during session initiation to "scale up" all advertised Receive Window values. The Window Scale Option is a value between 0 and 14 and represents a power of 2 multiplier to the Receive Window. This option allows hosts to advertise a Receive Window size of up to $64K*2^{14}=1$ Gigabyte.

Consumer broadband connections are usually long fat pipes (LFPs)—high bandwidth TCP connections. These LFPs, which may comprise multiple channels 'bonded' together to carry program information for a single stream, typically have with large round-tip delays. With LFPs, a host's advertised Receive Window often unnecessarily limits the overall session bandwidth. Once a connection is established over an LFP, a transmitting host will typically source a Receive Window's worth of data into the network and halt transmission while the data propagates through the LFP to the receiver. The transmitter will not resume transmission until a TCP ACK containing a new Receive Window advertisement is received from its peer. This on-again, off-again behavior at the transmitter severely reduces overall session throughput. One remedy for poor LFP performance is to use the Window Scale Option at the receiving host to advertise a larger Receive Window to the transmitter. The increase in advertised Receive Window size accounts for the in-flight data propagating over the LFP and allows the transmitter to source more data into the network before halting transmission. The resulting reduction in the transmitters "off time" increases the connection throughput.

Enabling the Window Scale Option on a PC is not a straightforward process and is beyond the capabilities of the average broadband subscriber. Thus, there is a need in the alt for a method and system for automatically adjusting the receive window size over a broadband network.

SUMMARY

Two examples of methods that facilitate automatic adjustment at a network device of the receive window for a receiving device include a) modifying a SYN packet and b) modifying every TCP packet.

An edge router/switch may intercept "SYN" packets sent from a subscriber during TCP connection establishment and add or adjust the Window Scale Option before forwarding the SYN packets on to their destinations. The value of the added/adjusted Window Scale Option can be tuned to account for the propagation delay of the LFP between the subscriber and the far host.

Alternatively, an edge router may intercept every TCP packet sent from a subscriber and increase the Receive Window in the TCP header to account for the propagation delay of the LFP between the subscriber and the far host. The Receive Window increment can be tuned to account for the propagation delay of the LFP between the subscriber and the far host.

In an aspect, a method for adjusting the receive window size (SEG.WND) value in a TCP segment would perform the steps of intercepting on an intermediate network element (e.g., a router) a TCP segment that was originally transmitted from a TCP client and is destined to a TCP server. The method would determine whether the receive window size value in the intercepted TCP segment is less than a predetermined value and would alter the receive window size value in the intercepted TCP segment according to a predetermined formula to create an altered TCP segment. Then, the method would correct any required checksums associated with the altered TCP segment to account for the altered received window size value to create a corrected TCP segment and forward it on toward the TCP server.

In another aspect, a method for adjusting the extended receive window size value in a TCP segment would perform the steps of intercepting on an intermediate network element (e.g., a router) a TCP segment that was originally transmitted from a TCP client and is destined to a TCP server. The method would determine whether the intercepted TCP segment is a SYN segment (typically a SYN bit is set) that can support the TCP Window Scaling Option (the SYN segment has a 3-byte Window Scaling Option field). If so, the method would alter the Window Scaling Option value in die intercepted TCP SYN segment with support for the Window Scaling Option according to a predetermined formula to create an altered TCP SYN segment with support for the Window Scaling Option. The method would then typically correct checksums associated with the altered TCP SYN segment with support for the Window Scaling Option to account for the altered Window Scaling Option value to create a corrected TCP SYN segment with support for the Window Scaling Option. The method would then forward the altered and corrected TCP SYN segment with support for the Window Scaling Option on toward the TCP server.

DETAILED DESCRIPTION

As a preliminary matter, it readily will be understood by those persons skilled in the alt that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
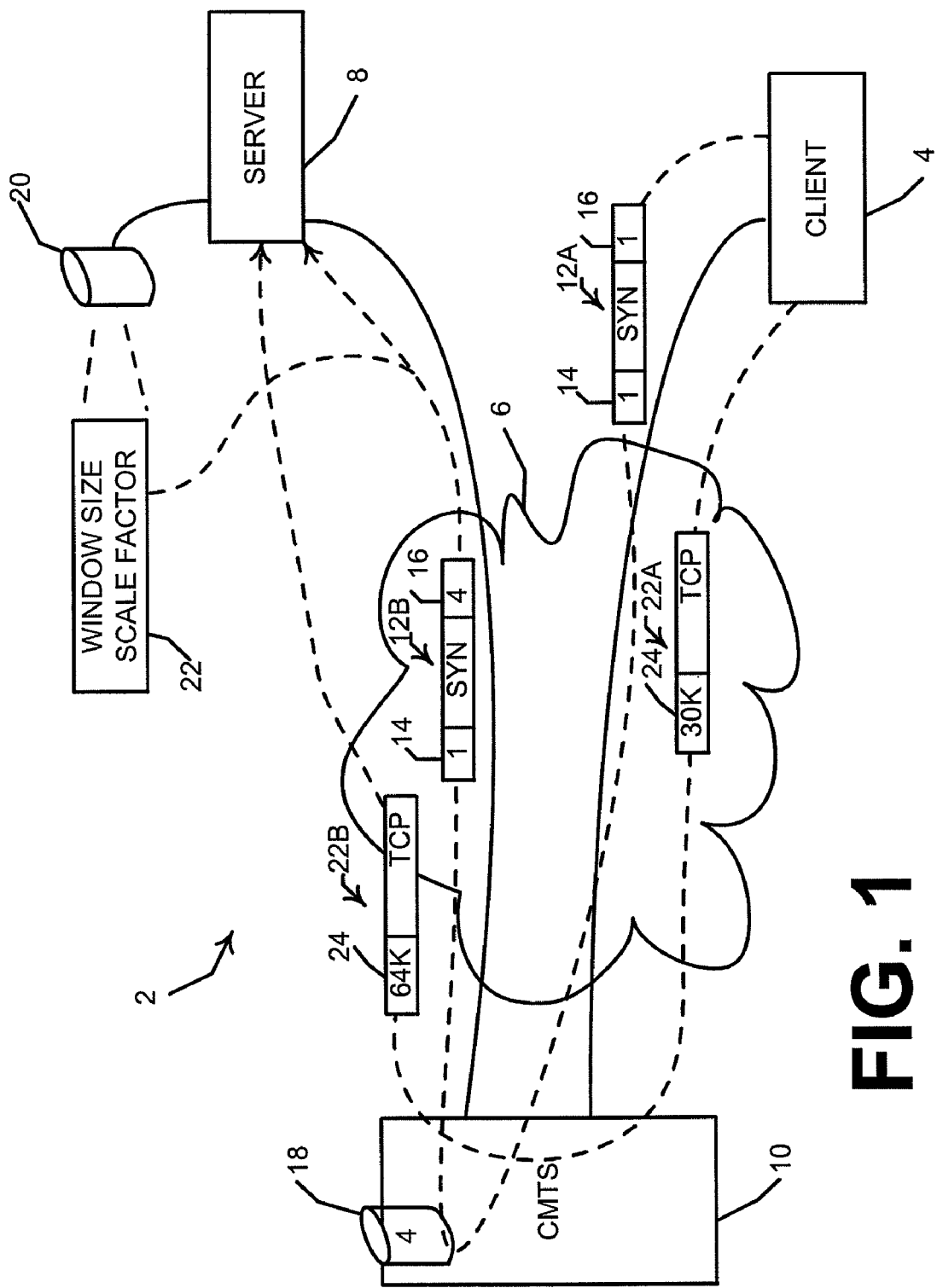
FIG. 1 illustrates a communication system for altering communication segments at an intermediate communication device.

Turning now to the figures, FIG. 1 illustrates a communication system 2 for altering communication segments at an intermediate communication device. A client device 4 communicates over a communication network 6, such as a hybrid fiber coaxial cable ("HFC") network, with a server device 8. Communications between client 4 and server 8 typically are processed by a centrally located intermediate network element, or device, 10, such as a router, a CMTS, a switch, or other device that processes and directs network traffic. For purposes of example, client 4 may refer to a consumer's home personal computer ("PC") and server 8 may refer to a web site operator's web server. It will be appreciated that either client 4 or server 8 can be coupled to element 10 via network 6 as shown, or may be coupled to the intermediate network element from another network connection, such as an Ethernet connection to the internet or a connection to a public switched telephony network. Server 8 and client 4 communication may communication using internet protocol ("IP") and related protocols, such as transmission control protocol ("TCP"), which is a core protocol of the internet protocol suite, as known in the alt.

Communication information and data is typically carried in packets, or segments, from one user device to another user device. A user device requesting information is typically referred to as a client and the device that the information is requested of is typically referred to as a server. As an example, client device 4 initiates a TCP session and sends a synchronization segment 12A, or SYN segment, toward server 8. SYN segment 12A may include a SYN bit 14, that is set (set is represented in the figure as a value of '1') to indicate to another network device that it is indeed a SYN segment. SYN segment 12A may also include a receive window scaling option field 16. The receive window scale option field 16 is typically a three-byte field in segment 12A and not only provides a window scale value, but also indicates that the TCP sending device, in this case client 4, is prepared and ready to perform receive window scaling in both the send and receive directions.

As SYN segment 12A propagates through network 6 after being sent from client 4, the SYN segment is intercepted by intermediate network device 10 (a CMTS is shown, but item 10 may also refers to other types of centrally located network devices that couple the client and server). When SYN segment 12A is intercepted, CMTS 10 evaluates the segment to determine whether it is a SYN segment and if so, whether it indicates that receive window scaling is enabled at client 4. If the result of both evaluations is true, then the CMTS inserts a value retrieved from a memory 18 at the CMTS that stores a scaling value.

The value retrieved from memory 18 and inserted into the SYN segment replaces the receive window size value stored in portion 16 of segment 12A. The result of the replacement is that the altered SYN segment, now shown as segment 12B, includes the original SYN bit set in portion 14, but field 16 now contains a '4' rather than '1' as was in SYN segment 12A sent from client 4. It will be appreciated that the SYN segment structure is depicted in the figure for clarity and simplicity of illustration, and may not be representative of the structure of an actual segment. Indeed, a typical TCP segment, including a SYN segment, would have SYN bit portion 14, and receive window size value portion 16 at the beginning bytes that precede a segment's payload.

When server 8 receives the depicted SYN segment 12B, the receive window size scale value from portion 14 is stored to memory 20. The value stored as value 22 is then used to scale all receive window size values in TCP segments received subsequent to receiving SYN segment 12B.

Another aspect shown in FIG. 1 depicts CMTS 18 altering a TCP segment sent from client 4 when the CMTS intercepts the segment before forwarding it to the destination server 8. A typical non-SYN TCP packet 22A contains a receive window value in a predetermined sixteen-bit receive window value portion 24. This receive window value is typically based on the current capacity of a receive buffer at client 4 when the client sends TCP packet 22A, or segment. In the example shown in the figure, the current capacity of the buffer at server 4 can support receiving 30K bytes of data. However, since the round trip time of segment 22A propagating to CMTS 10, which intercepts it and forwards it on to server 8 and any return segments sent from server 8 to client 4 via the CMTS takes a finite amount of time, and during that time the receive buffer at the client will have increased capacity as its contents are processed, the receive window size value can be artificially increased at the CMTS. This provides the advantage that server 8 will send more segments back to client 4 that the receive window value in portion 24 indicates, thus making efficient use of the buffer's increased capacity that will be available when the return segments are received at the client. It will be appreciated that typically after network element 10 alters a segment, or packet, it connects checksums associated with the altered segment.

Accordingly, the figure depicts TCP segment 22A as sent from client 4 with a receive window size value of 30K, but after being intercepted at CMTS 10, the CMTS replaces the value in portion 24 with a value determined according to a predetermined formula if the value in segment 22A is less than a predetermined amount. In the example, assuming that the predetermined value is 64 Kbytes (the maximum that can be represented by the sixteen-bit portion 24), CMTS 10 replaces the value in portion 24 of segment 22A with a binary value representing 64K, and altered segment 22B is the result, having a value of 64K in its portion 24. This aspect ensures that server 8 will always send a minimum number of segments at each transmission during the session. It will be appreciated that the predetermined value and predetermined formula may be stored on memory 18 along with the receive window scale factor value discussed above.

Furthermore, it will be appreciated that the receive window scales factor value aspect and the replacing of the receive window size value aspect may both be used to increase the number and size of TCP segments sent from server 8 to client 4. For example, if the scale factor is 4, as discussed above and the receive window value is changed from 30K to 64K bytes, then server 8 would receive segment 22B and scale it by the scale factor stored at memory 20. The result of scaling 64K bytes by the scale factor of 4 is $2^4 \times 64K = 16 \times 64K = 1,024,000$ bytes, or 1. Megabyte. Thus, although client 4 sent out a SYN segment 12A with a scale factor of 1 and a subsequent TCP segment 22A with a receive window size value of 30K, CMTS 10 altered the SYN segment and subsequent TCP segment so that server 8 will send segments totaling 1 megabyte to client 4 after receiving altered segment 22B. Combining the second aspect of altering the value in the portion 24 of a TCP segment with the scaling aspect prevents a no-send situation which would occur if the value in the receive window size value was zero in the TCP segment (scaling zero results in zero).

It will, be appreciated that typically after network element 10 alters a segment, or packet, it corrects checksums associated with the altered segment.

Figure 2:
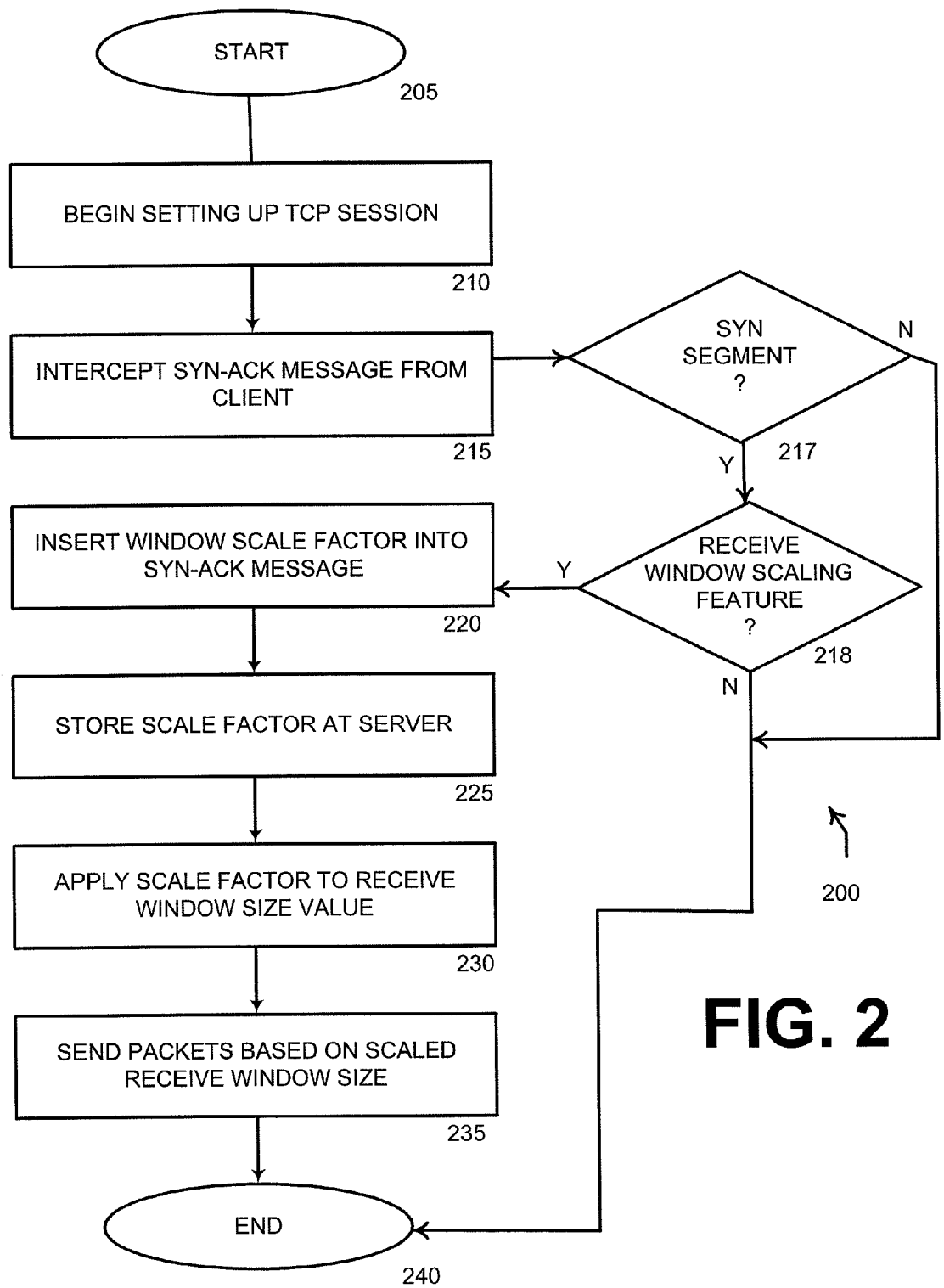
FIG. 2 illustrates a flow chart for a method for adjusting a receive window value by modifying a SYN packet.

Turning now to FIG. 2, the figure illustrates a flow diagram of a method 200 for adjusting a scalable receive window size value for regulating transmission of TCP segments. Method 210 starts at step 205. At step 210, a TCP client begins setting up a TCP session with a TCP server. The TCP client may be, for example, a personal computer coupled to a network device, such as a cable modem, DSL modem, dial up modem, network interfaced card, etc. The TCP server may be, for example, a web server hosting a web site, a video program server, a media gateway, or other communication device. The client generates a SYN message that is sent to the server as know in the art related to TCP networking, as detailed in RFC-1323, for example, which is incorporated herein by reference in its entirety. The SYN message, or segment, as referred to in RFC-1323 (segments may also be commonly referred to as packets) is sent from the TCP client to the TCP server.

As discussed above, the TCP client may be coupled to a communication device that interfaces with a communication network, such as, for example, a cable network, a DSL network, a telephony network or a local area network, in the case of the network device being a cable modem, a DSL modem, a dial up modem or a network interface card, respectively. In the communication networks, the network devices typically couple to a central device, such as, for example, a cable modem termination system ("CMTS") in a cable network, which is sometimes referred to as a hybrid fiber coaxial ("HFC") network. The CMTS, or other similar device in other networks, is referred to as an intermediate network device herein and in the Claims section.

At step 215, the CMTS receives, or intercepts, the SYN segment. A determination is made at step 217 whether the intercepted segment is a SYN segment by evaluating whether a SYN bit position/SYN flag within the SYN segment is set. If the determination at step 217 is that the segment is not a SYN segment, then method 210 ends at step 240.

If the determination at step 217 is that the intercepted segment is a SYN segment, then a determination is made at step 218 whether the TCP client device supports an optional Receive Window Scaling feature. This determination may be made by evaluating the segment for, for example, a 3-byte Window Scaling Option field. If the scaling option field is not detected, method 200 ends. If a scaling option field is detected at step 218, a scale factor value is inserted into the scaling option field at the CMTS, or other intermediate network device, and the segment is forwarded on to the TCP server at step 220.

At step 225, the TCP server receives the SYN segment, extracts the scale factor value from the SYN segment and stores the scale factor value to a memory at the server. The memory could be any memory known to those skilled in the alt, including RAM, hard drive, flash memory, etc.

As other packets/segments are received at the TCP server in the future, which will probably not be TCP SYN segments and will likely be segments carrying data or other content information, a receive window value, as known in the art and as described in RFC 1323, is evaluated. Although described in RFC-1323, briefly, a receive window size value is used to inform a server how much memory capacity a client has to receive segments. According to the TCP protocol, the largest value that the sixteen-bit receive window value corresponds to is 64K bytes.

To compensate for round trip delay time, as discussed above, the scale factor is applied to the receive window size value at step 230. Essentially, the sixteen-bit receive window value size is scaled by the scale amount (defined to be 2** (scaling option field value)) and the server then transmits a number of bytes to the requesting client up to the number of the scaled receive window value size at step 235. For example, if the scale value is $00000100_2 = 4_{10}$ then the receive window size value would be multiplied by $2^4 = 16_{10}$. If the receive window size value received in a given TCP packet corresponded to 10K bytes, and the scale factor stored at the server were $00000100_2$, then the server would send up to 160K bytes to the requesting TCP client at step 235. Method 200 ends at step 240.

Figure 3:
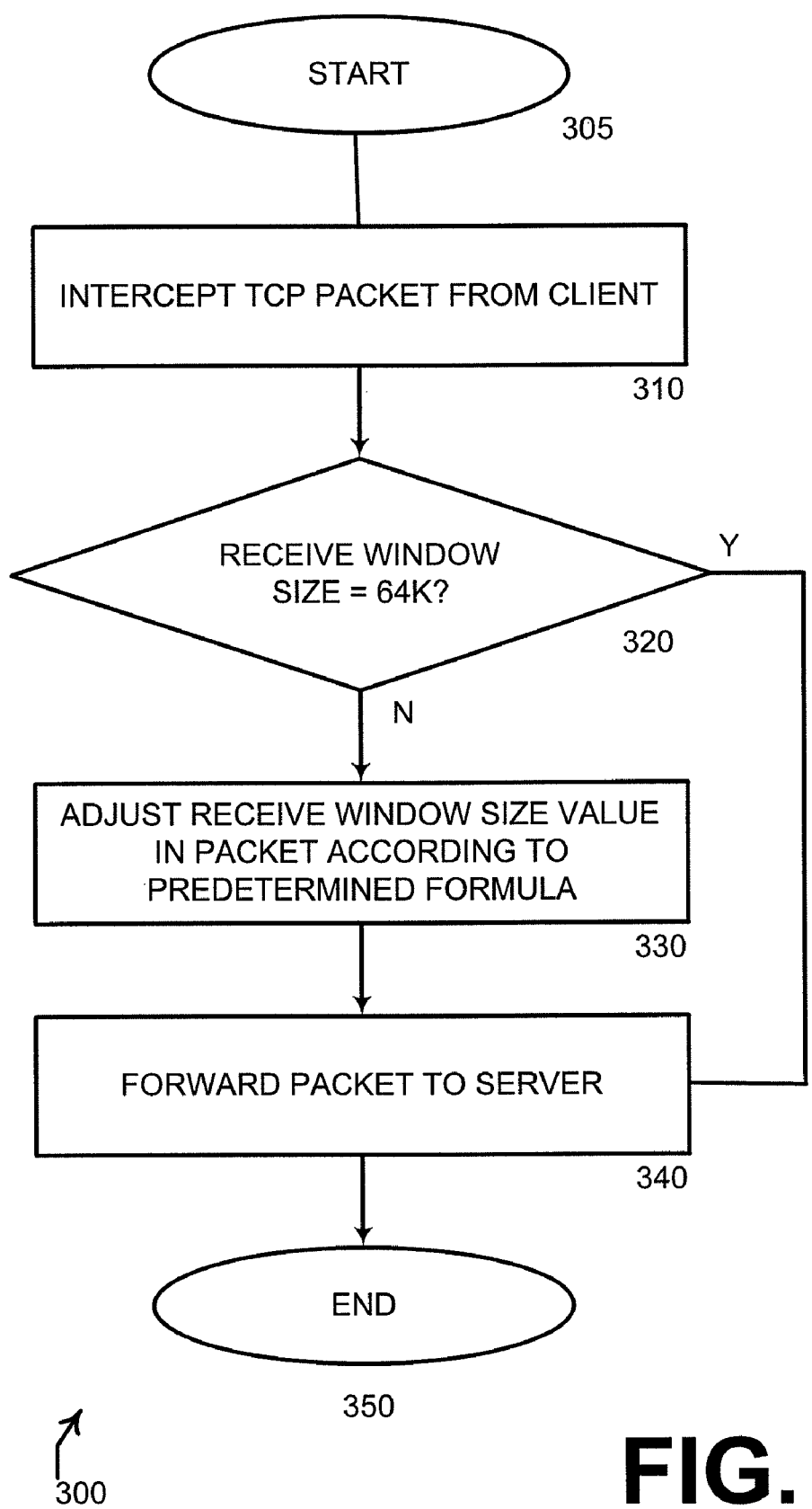
FIG. 3 illustrates a flow chart for a method for adjusting a receive window value by modifying a TCP packets.

Turning now to FIG. 3, a flow diagram illustrates a method 300 for adjusting the size of the receive window value at an intermediate network device. Method 300 starts at step 305. Following initial start up of a TCP session as discussed above and in RFC 1323, an intermediate network element/device intercepts a TCP segment at step 310 from a TCP client. The segment is evaluated at step 320 and a determination is made whether the receive window size value—referred to in RFC-1323 as receive window size (SEG.WND) value—in the TCP segment is less than a predetermined number. The predetermined number is preferably 64K bytes, but can be another value as chosen by the operator of the intermediate network device. If the value of the receive window size is not less that the predetermined number, then method 300 forwards the segment to the TCP server at step 340.

If the receive window value is determined by the intermediate network device at step 320 to be less than the predetermined value, for example 64K bytes, the intermediate network device adjusts the receive window size value in the TCP packet according to a predetermined formula. The formula may be, for example, 'x=64K', thus always forcing the receive window size value to be 64K, or whatever other constant value that the operator of the intermediate network device chooses. After the receive window size value has been adjusted, or altered, at step 330, the altered segment for which the receive window value has been altered, is forwarded to the TCP server at step 340. method 300 ends at step 350.

What is claimed is:

1. A method for adjusting a scalable receive window size value for regulating transmission of TCP segments, comprising:
   intercepting at a cable modem termination system a TCP segment transmitted from a TCP client and destined to a TCP server;

determining whether the intercepted TCP segment is a SYN segment with support for a TCP Window Scaling Option;

if the intercepted segment is a SYN segment, altering a Window Scaling Option value in the intercepted TCP SYN segment with support for the Window Scaling Option according to a predetermined formula to create an altered TCP SYN segment with support for the Window Scaling Option;

correcting a checksum associated with the altered TCP SYN segment to account for the alteration to the TCP SYN segment;

forwarding from the cable modem termination system the altered TCP SYN segment with support for the Window Scaling Option toward the TCP server;

receiving the altered TCP segment at the TCP server;

storing a scale factor value from the altered TCP segment to a memory at the TCP server;

applying the scale factor value from the memory to a receive window size value received in another TCP segment to result in a scaled receive window size value; and transmitting segments from the TCP server according to the scaled receive window size value.

2. The method of claim 1 wherein the step of altering the window scaling option value includes determining the scale factor value according to a predetermined formula; and inserting the scale factor value into a Window Scaling Option field.

3. The method of claim 1 further comprising:

if the intercepted TCP segment is not a SYN segment, determining whether a receive window size value in the intercepted TCP segment is less than a predetermined value;

altering the receive window size value in the intercepted TCP segment according to a predetermined formula if the receive window size value is less that the predetermined value to create an altered TCP segment; and forwarding the altered TCP segment toward the TCP server.

4. A method for adjusting a receive window size value in a TCP segment, comprising:

intercepting at a cable modem termination system a TCP segment that was originally transmitted from a TCP client and destined to a TCP server;

determining whether the receive window size value in the intercepted TCP segment is less than a predetermined value;

altering the receive window size value in the intercepted TCP segment according to a predetermined formula if the receive window size value is less that the predetermined value to create an altered TCP segment;

correcting a checksum associated with the altered TCP SYN segment to account for the alteration to the TCP SYN segment;

forwarding from the cable modem termination system the altered TCP segment toward the TCP server;

receiving the altered TCP segment at the TCP server;

storing a scale factor value from the altered TCP segment to a memory at the TCP server;

applying the scale factor value from the memory to a receive window size value received in another TCP segment to result in a scaled receive window size value; and transmitting segments from the TCP server according to the scaled receive window size value.

5. The method of claim 4 wherein the step of altering the intercepted TCP segment includes replacing the receive window size value in the intercepted segment with a value determined according to the predetermined formula.

6. The method of claim 5 wherein the predetermined formula is a constant.

7. The method of claim 5 wherein the predetermined formula includes a minimum function and a maximum function.

8. The method of claim 7 wherein the minimum and maximum functions are based on transmission times between the client and the server.

9. The method of claim 7 wherein the minimum and maximum functions are automatically adjusted based on historical changes in the receive window value size of preceding TCP segments and their corresponding altered TCP segments.

10. The method of claim 4 further comprising:

determining whether the intercepted TCP segment is a SYN segment with support for a TCP Window Scaling Option;

altering a Window Scaling Option value in the intercepted TCP SYN segment with support for the Window Scaling Option according to a predetermined formula to create an altered TCP SYN segment with support for the Window Scaling Option; and forwarding the altered TCP SYN segment with support for the Window Scaling Option toward the TCP server.

11. The method of claim 10 wherein the step of altering the intercepted TCP segment includes replacing the receive window size value in the intercepted segment with a value determined according to the predetermined formula.

12. A method for adjusting a scalable receive window size value for regulating transmission of TCP segments, comprising:

intercepting at a cable modem termination system a TCP segment transmitted from a TCP client and destined to a TCP server;

determining whether the intercepted TCP segment is a SYN segment with support for a TCP Window Scaling Option;

if the intercepted TCP segment is a SYN segment, altering a Window Scaling Option value in the intercepted TCP SYN segment with support for the Window Scaling Option according to a predetermined formula to create an altered TCP SYN segment with support for the Window Scaling Option, wherein the step of altering includes determining a scale factor value according to a predetermined formula and inserting the scale factor value into a Window Scaling Option field, the Window Scaling Option being altered to account for the propagation delay between the subscriber and the far host;

correcting a checksum associated with the altered TCP SYN segment to account for the alteration to the TCP SYN segment;

forwarding the altered TCP SYN segment with support for the Window Scaling Option toward the TCP server;

receiving the altered TCP segment at the TCP server;

storing the scale factor value from the altered TCP segment to a memory at the TCP server;

applying the scale factor value from the memory to a receive window size value received in another TCP segment to result in a scaled receive window size value; and transmitting segments from the TCP server according to the scaled receive window size value.

13. The method of claim 12 further comprising:

if the intercepted TCP segment is not a SYN segment, determining whether a receive window size value in the intercepted TCP segment is less than a predetermined value;

altering the receive window size value in the intercepted TCP segment according to a predetermined formula if the receive window size value is less that the predetermined value to create an altered TCP segment; and forwarding the altered TCP segment toward the TCP server.

* * * * *